Figures 2, 4:
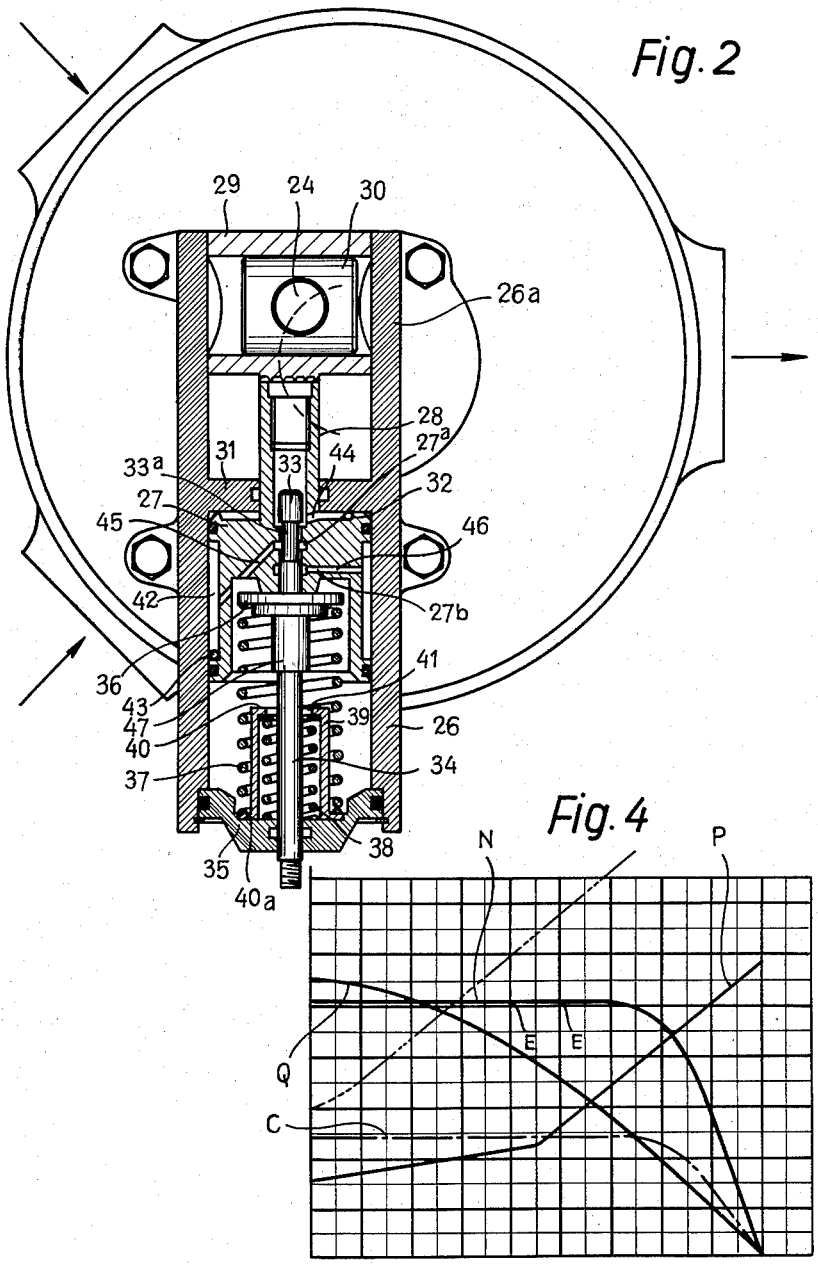

Jan. 24, 1961     L. MENON     2,969,021
AUTOMATIC DEVICE FOR ADJUSTING THE OUTPUT
OF ROTARY HYDRAULIC MACHINES
Filed April 13, 1959     2 Sheets-Sheet 1
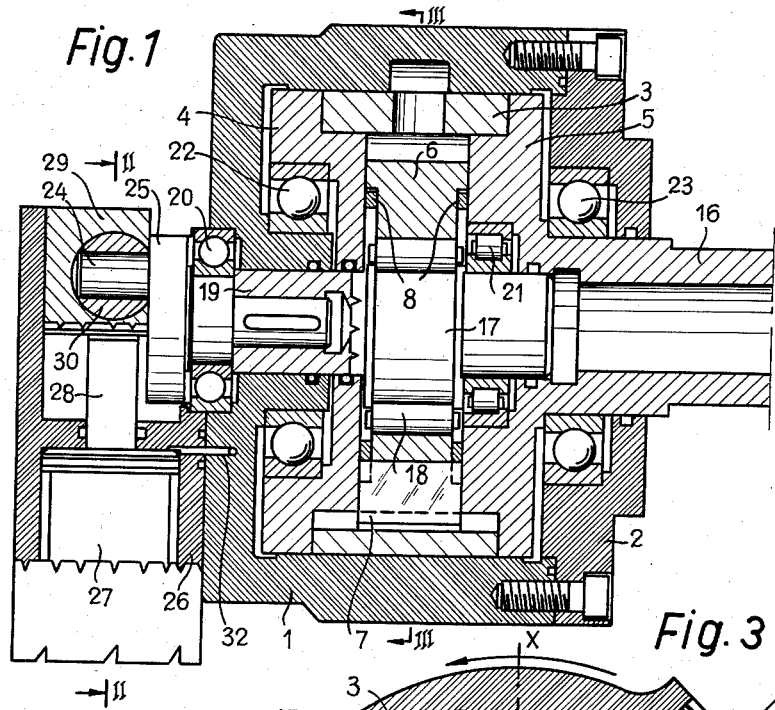
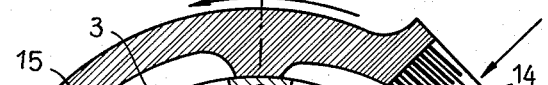
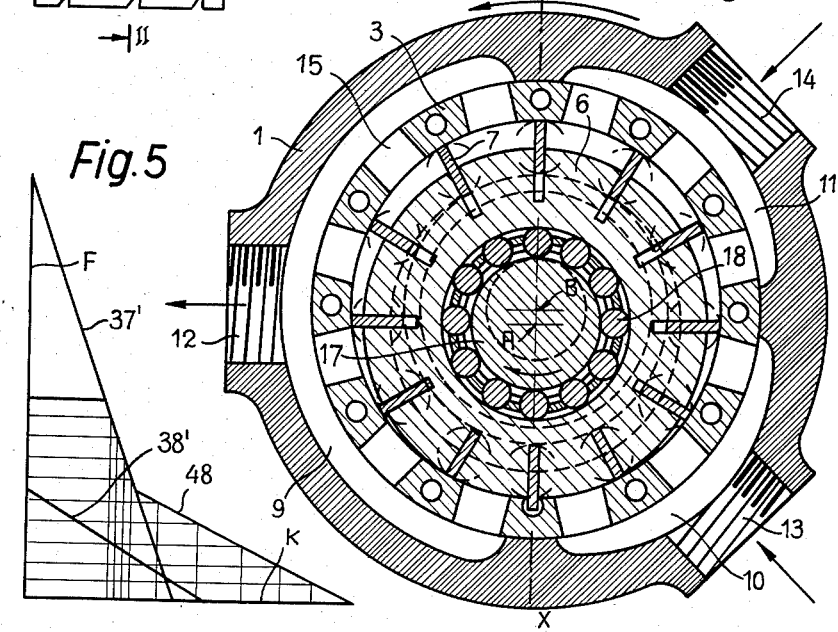

United States Patent Office 2,969,021
Patented Jan. 24, 1961

2,969,021

AUTOMATIC DEVICE FOR ADJUSTING THE OUTPUT OF ROTARY HYDRAULIC MACHINES

Luigi Menon, Turin, Italy, assignor to Soc. Acc. Emanuel di G. e R. Emanuel & C., Turin, Italy Filed Apr. 13, 1959, Ser. No. 805,775

Claims priority, application Italy Apr. 16, 1958

3 Claims. (Cl. 103—120)

This invention relates to an automatic device for adjusting delivery dependently upon pressure for adjustable delivery rotary hydraulic machines acting either as motors or pumps, of the type in which the variation in delivery is obtained by varying the orientation of a reaction member, or member on which the fluid pressure in the machine reacts, the delivery at each given angular position of the said reaction member being a cosinusoidal function of the angle between the said given angular position of the said reaction member and the angular position corresponding to maximum delivery, the said angle being referred to hereafter as "adjusting angle."

This type of machine, which will be referred to hereafter in the specification and claims as machines of the type referred to, includes pumps or motors disclosed by our copending patent application Ser. No. 805,774, filed April 13, 1959, comprising a bladed rotor acting as a reaction member, eccentrically mounted in a cylindrical recess. In this machine variation in delivery is obtained by varying the angular position of the rotor axis in the cylindrical recess, as explained in detail hereafter.

These hydraulic machines are generally, though not exclusively adopted in variable speed transmissions.

This invention provides an automatic adjusting device for use as indicated above, by means of which the power delivered by the machine, when the latter acts as a pump, or power absorbed by the machine, when the latter acts as a motor, is maintained substantially constant over a wide range of variation in delivery in the case of a pump, or number of revolutions in the case of a motor.

The automatic device for adjusting delivery dependently upon pressure for adjustable delivery rotary hydraulic machines according to this invention, is characterized by the fact that the device comprises means for varying the angular position of the reaction member, responsive to the high pressure in the machine, acting on the said reaction member by forces which are proportional at any given position of the said member to the secant of the adjusting angle, to thereby change delivery in accordance with a law which is substantially reverse to the law of pressure variation, in order to maintain the absorbed or delivered power in the machine substantially constant over wide adjusting range of the machine itself, the said variation means including variable flexibility resilient members acting on the said reaction member by forces oppositely directed to the forces exerted on the reaction member by the hydraulic fluid pressure in the machine.

Further characteristic features, advantages and uses of this invention will be understood from the appended detailed description referring to the accompanying drawings, which are given by way of example only, wherein:

Figure 1 is an axial sectional view of a rotary machine of the type referred to, provided with an improved adjusting device, Figure 2 is a sectional view of Figure 1 on line II—II;
Figure 3 is a sectional view of Figure 1 on line III—III; and
Figures 4 and 5 show operational diagrams of the machine.

The invention will be described in connection with a rotary machine according to the above mentioned co-pending application. However, as will be readily understood by experts in the field, the invention can be moreover used in connection with well-known machines of other type such as, for instance, machines in which the reaction member comprises a tumbler disc acting on pistons in parallel cylinders situated on the surface of a virtual cylinder.

The machine comprises a body 1 of tumbler shape, closed by a cover 2 to form a cylindrical hollow in which a drum is rotatable comprising a cylinder 3 and side walls 4 and 5.

In the drum a cylindrical chamber is formed having eccentrically mounted therein a rotor 6 equipped with blades 7 radially movable in grooves formed in the rotor held by rings 8 in contact with the inner surface of the cylinder 3 of the drum; in the inner surface of the cylindrical portion of the body 1 arcuated grooves 9, 10 and 11 are formed which connect with ports 12, 13 and 14, respectively.

The variable volume chambers confined by contiguous blades, the inner surface of the cylinder 3 and outer surface of the rotor connect during rotation of rotor with the arcuated grooves 9, 10 and 11 through radial ports 15 bored in the said cylinder 3.

The side wall 5 of the drum is integral with a hollow shaft 16 serving as a driving shaft in a pump construction and outlet shaft in a motor construction.

The rotor 6 is capable of rotating through the interposition of rollers 18 on an eccentric portion 17 of a shaft 19 which ends externally by a crank 25 having an eccentric pin 24. The shaft 19 is supported by antifriction bearings 20, 21 seated by their outer race ring in the bottom of the body 1 and side wall 5 of the drum, respectively. The drum is supported in turn by antifriction bearings 22, 23 housed by their outer race ring in the bottom of the body 1 and in the cover 2, respectively.

On rotation of the drum 3, 4, 5 where the machine acts as a pump and in the maximum delivery condition shown in Figure 3, the hydraulic fluid is sucked through ports 13, 14 and fed through the port 12. On variation in orientation of the plane X—X extending through the axes A of the rotor 6 and B of the cylindrical hollow recess in the drum, such as by clockwise rotation of the shaft 19, part of the hydraulic fluid drawn through the port 13 is returned to the reservoir through the port 14, the remaining portion being fed through the delivery port 12. In this manner by varying the angular position of the reaction member of the machine, which is constituted by the rotor, the fluid delivery through the machine is varied.

It will be obvious that at each given angular position of the shaft 19 delivery depends upon the adjusting angle between the plane X—X for such given angular adjusting position, and the position taken by the plane X—X in the maximum delivery condition illustrated in Figure 3.

The eccentric portion 17 of the shaft 19 is subjected during operation of the machine to a torque tending to rotate the shaft 19 towards its no-delivery position, this torque being the result of the reaction on the rotor of the high pressure of the liquid in the machine.

Where a pump of this type is employed in a hydraulic transmission in order to maintain the transmitted power constant, the pump delivery should vary in a reverse proportion to the progress of the high pressure; i.e. since the delivery at each given angular position of the plane X—X is a function of the cosine of the adjusting angle, a torque should be exerted on the eccentric pin 24, which is indirectly proportional to the said cosine, hence proportional to the secant of the adjusting angle.

The invention provides an automatic device for controlling said pin, hence the reaction member, in such manner as to maintain the power absorbed by the pump substantially constant within the wide pump adjusting range.

The automatic control device could comprise merely variable flexibility resilient members, which apply to the shaft 19 moments directed oppositely to the moments applied to the rotor by the pressure of the hydraulic fluid in the machine.

The said resilient means, if employed without any further reserve, would become excessive in size and weight. The invention therefore provides a device operatively linking the rotor to the resilient means, which is simple in construction and small in size and capable of damping vibrations which would otherwise develop on the rotor if an adjusting device simply comprising variable flexibility springs were employed.

According to a preferred construction of this invention as shown on the drawings the control means comprises a cylinder 26 secured to the body 1 of the machine. A differential piston 27 is movably arranged in the cylinder and provided with an extension 28 reduced in diameter for actuating the pin 24. The extension 28 is provided with a hollow cylindrical head 29 movable in an extension 26a on the cylinder 26, the axis of which is perpendicular to the axis of the cylinder 26. In the cylindrical recess in the head 29 a cylindrical slide 30 is movable, which is formed with a diametral hole through which the pin 24 extends. This results in a pin and slot connection of the piston 27 and eccentric pin 24, such as to eliminate any offset stresses on the piston 27 by the pin 24.

The cylinder 26 is closed at the bottom by a cap 35 and at the top by a cap 31 through which the extension 28 on the piston extends. Adjacent the cap 31 a passage 32 is bored in the cylinder 26 and connects through conduits not shown on the drawing with the high pressure side of the machine.

A groove 42 is cut in the differential piston 27 and connects at any position of the piston with a passage 43 bored in the cylinder 26, the passage 43 connecting with the low pressure side of the machine through conduits not shown on the drawing.

An axial cylindrical seat is formed within the differential piston 27 for a slide valve. The valve member 33 is formed with a groove 33a cooperating with grooves 27a and 27b formed in the seat connecting with the lower hollow in the cylinder 26 through a conduit 45 and with the groove 42 through a conduit 46, respectively.

The extension 28 on the piston 27 is of tubular shape and receives the head portion of the slide valve member 33. The hollow in the extension 28 connects with the passage 32 through a hole 44 bored in the bottom of the extension 28.

The valve member 33 has a stem 34 slidable in a central aperture bored in the cap 35 for the cylinder 26 and is provided with an integral disc 36 acted upon by resilient means comprising a pair of volute springs 37 and 38 arranged coaxially around the stem 34.

The spring 38, which is shorter than the spring 37, is enclosed by a bushing 39 securedly fixed with the cap 35 and having an inner flange 40 on which one end of the spring 38 bears through the interposition of a washer 41 in its inoperative position. The opposite end of the spring 38 bears on the cap 35.

The spring 37 acts at one end on the disc 36 direct, its opposite end bearing on an outer flange 40a on the bushing 39.

The diagram of the springs 37, 38 is shown in Figure 5, in which the axis of the abscissae indicated the load springs K, the ordinates indicating their deformations F.

The diagrams of springs 37, 38 are indicated at 37', 38', respectively. As long as the valve member 33, hence its stem 34 move without an annular rabbet 47 on the stem 34 engaging the washer 41, the force opposing displacement of the said valve member follows the form of line 37', but as the rabbet 47 abuts the washer 41, the load opposing displacement of the valve member follows as a function of such displacement the line 48 obtained by summing, at each position, the loads of spring 37 with the load of spring 38. The result is a spring, the flexibility of which varies with deformation.

The criterions for the choice of flexibility of the two springs shall be described hereafter with reference to Figure 4.

The adjusting device operates as follows. As long as the fluid pressure acting against the valve member 33 exerts an axial thrust smaller than the initial load of spring 37, the valve member, hence the piston 27 remains in the position shown on the drawing.

Under these conditions, the two opposite faces of the piston are both connected to the high pressure side of the machine. The piston remains in the position shown both owing to the thrust by the spring 37 and the fact that its lower surface exposed to high pressure, which is constituted by the piston section decreased by the section of the valve member 33 is larger than the top section of the piston surface, which is constituted by the section of the piston decreased by the section of the extension 28 and section of the valve member 33.

As soon as the pressure on the high pressure side of the machine acts on the valve member 33 by a thrust which exceeds the initial load of spring 37, the valve member 33 is moved downwardly, cutting off the lower chamber in the cylinder 26 from the high pressure and connecting the said lower chamber with discharge through conduit 44, grooves 27a and 27b, conduit 46 and groove 42. Under these conditions, the piston 27 moves downwardly discharging oil through the passage 43. As soon as the piston has lowered by an extent such as to re-establish connection of the high pressure passage 32 and lower chamber in the cylinder 26 through the groove 27a and conduit 45, the piston 27 stops and the valve member and piston persist in a fresh balanced condition corresponding to a fresh adjustment of the machine delivery.

Under balanced conditions at any given pressure, consequently at any delivery dependent thereon, the valve member 33 occupies a position at which the liquid oozing from the high pressure to the low pressure through the steps formed on the valve member and grooves in the valve seat creates pressure conditions in both chambers in the cylinder 26 which, when summed to the thrust on the piston 27 by the eccentric pin 24, hold the piston in a balanced condition.

The springs 37, 38 are designed so that the pressure indicated by the broken line P in Figure 4, in which the axis of the abscissae indicates the values of the adjusting angle of the rotor, is substantially reverse in form to the curve Q relating to delivery. Since the curve Q is a cosine, the broken line P should approach as nearly as possible a function of a secant.

By employing a pair of springs arranged as illustrated, pressure values can be obtained which, when multiplied by the corresponding delivery values provide on a suitable scale points E of power values which are very approximately constant within a wide adjusting range of the machine.

Where a power curve N of still more constant form is desired, it will be sufficient to adopt a larger number of springs 37, 38 arranged to successively come into action during operation of the slide valve member 33.

Figure 4 still indicates the torque curve C which, since a pump of constant power and constant number of revolutions is involved, is obviously constant over a wide range.

It will be obvious that the invention provides an adjusting device which is adapted to maintain the absorbed power or delivered power, respectively, of a hydraulic machine substantially constant.

It will be obvious, that the principle of the invention being left unaltered, embodiments and constructional details may be widely varied with respect to the non-limiting example described and shown without departing from the scope of this invention.

By way of example, instead of employing a plurality of springs successively coming into action, one spring can be employed which is of variable flexibility, namely the spring flexibility decreases as deformation increases. The spring can conveniently comprise a rubber block subjected to compression or buckling stresses, which is suitably retained. Alternatively, the spring may comprise a torque bar anchored at one end to a fixed point and its other end to the shaft 19 or valve member of a servo-control valve. In order to afford variation in flexibility, the torque bar should be provided with radial juttings spaced longitudinally of the bar in order to sequentially cooperate one after another on rise in deformation with fixed abutments so as to decrease the operative bar portion, hence its flexibility.

What I claim is:

1. The combination of a variable delivery rotary hydraulic machine including a casing having a cylindrical cavity therein, a vaned rotor rotatable in the cavity on an axis excentrical with respect of the axis of the cavity thereby to define a revolving series of variable volume chambers in the cavity around the rotor, low and high pressure ports operatively associated with the revolving series of variable volume chambers for hydraulic fluid displacement through the machine, and crank means associated with the rotor axis for angularly displacing the latter around the axis of the cavity within a predetermined adjusting angle thereby to vary the hydraulic fluid displacement through the machine; and of an automatic control device for the said crank means including a fluid-tight cylinder fast with the casing, a piston axially slidable in the cylinder in a fluid-tight condition sub-dividing the cylinder into low and high pressure chambers respectively adjacent the opposite ends of the cylinder, a hollow axially directed extension on the piston extending from the latter through the high pressure chamber and the adjacent end of the cylinder, a crank-pin on the said crank means normally acting on the said extension to displace the piston towards the low pressure chamber in the cylinder as a result of hydraulic fluid pressure on the rotor on operation of the machine, passage means in the cylinder constantly connecting the high pressure chamber with the high pressure port of the machine, a passage in the extension constantly connecting the inside of the latter with the high pressure chamber, a valve member axially slidable in the piston having a section thereon exposed to high pressure prevailing within the extension whereby the valve member is axially urged towards the low pressure chamber, a passage in the piston controlled by the said valve member connecting the low pressure chamber with the inside of the extension arranged for being closed by the valve member on displacement of the latter with respect of the piston towards the low pressure chamber, venting passage means across an intermediate part of the cylinder and piston arranged for venting the low pressure chamber via the said passage in the piston on the said displacement of the valve member, and spring means in the low pressure chamber acting on the valve member to urge the latter and piston towards the high pressure chamber thereby to open the communication between the passage in the cylinder and the inside of the extension and to close the venting passage means in the cylinder by the valve member, the said spring means exhibiting a load characteristic curve referred to adjusting angle values of the rotor axis which is substantially inverse of the fluid delivery characteristic curve of the machine referred to the said adjusting angle values.

2. The combination as claimed in claim 1, wherein the said venting passage means comprises an annular circumferential clearance space on the piston intermediate the ends of the latter, a venting passage in a cylinder wall section adjacent the clearance space at a location assuring a permanent communication between the venting passage and clearance space irrespective of the positions of the piston in the cylinder in operation, and a radial passage in the piston one end of which is in valve member-controlled connection with the passage in the piston connecting the low pressure chamber with the inside of the extension and the opposite end of which opens in the said clearance space.

3. The combination as claimed in claim 1, wherein the said spring means comprises a pair at least of helical metal springs arranged for being sequentially compressed by the valve member upon displacement of the latter and piston towards the low pressure chamber.

References Cited in the file of this patent

UNITED STATES PATENTS

| | | |
|---|---|---|
| 1,486,836 | Hill | Mar. 11, 1924 |
| 2,026,776 | Douglas | Jan. 7, 1936 |
| 2,093,690 | Wiedmann | Sept. 21, 1937 |
| 2,238,062 | Kendrick | Apr. 15, 1941 |
| 2,238,063 | Kendrick | Apr. 15, 1941 |
| 2,606,503 | Shaw | Aug. 12, 1952 |
| 2,716,946 | Hardy | Sept. 6, 1955 |
| 2,764,941 | Miller et al. | Oct. 2, 1956 |
| 2,768,585 | Hardy | Oct. 30, 1956 |
| 2,823,614 | Lapsley | Feb. 18, 1958 |
| 2,883,937 | Lauck | Apr. 28, 1959 |

FOREIGN PATENTS

| | | |
|---|---|---|
| 1,182,571 | France | Jan. 19, 1959 |